Sept. 26, 1967   M. E. OLSON   3,343,678
BEESWAX CAPPING SEPARATOR AND MELTER
Filed June 1, 1964   4 Sheets-Sheet 1
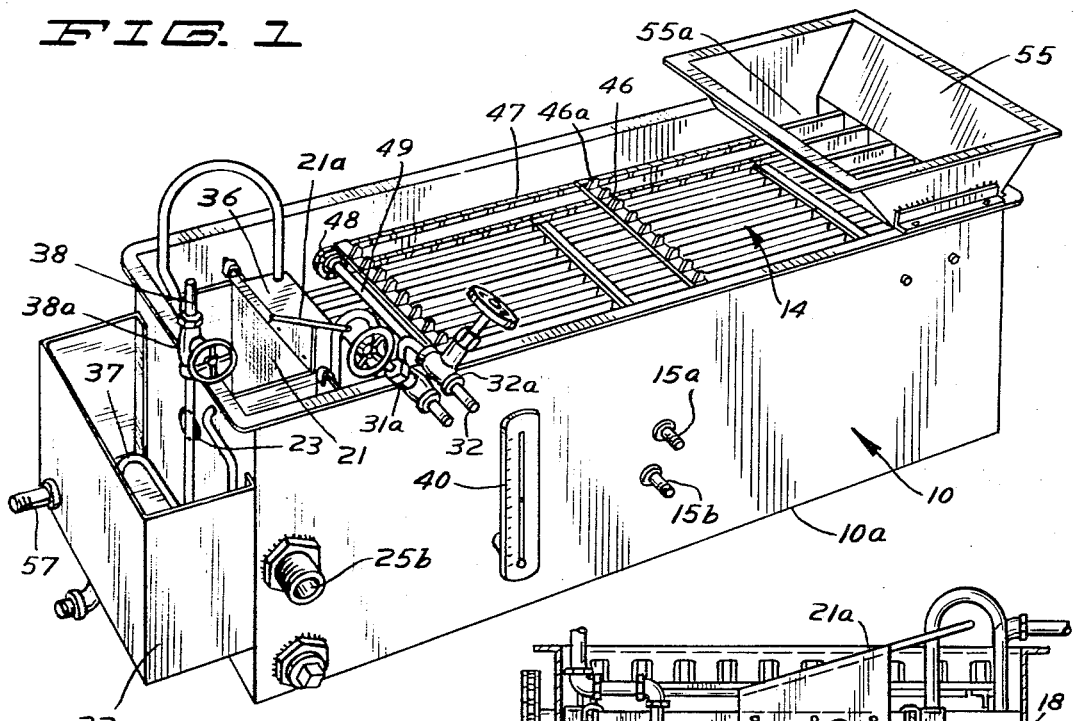
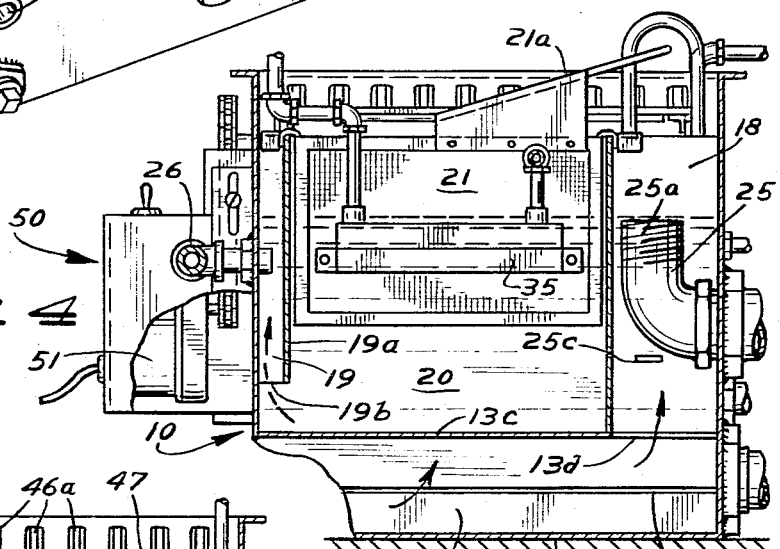
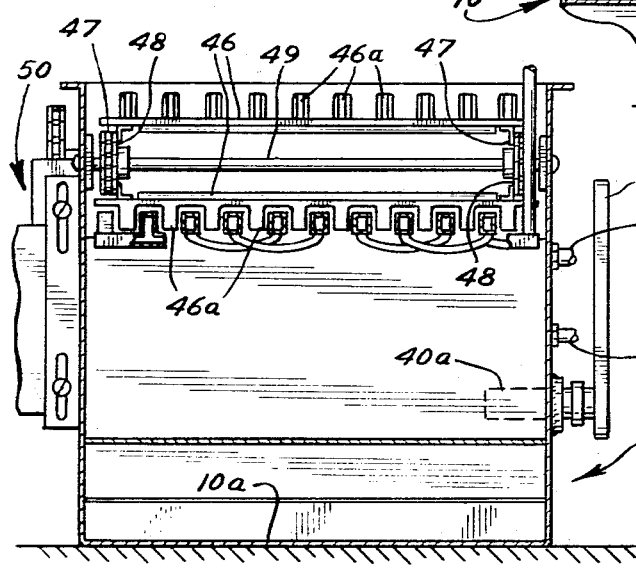
INVENTOR.
MELFORD E. OLSON
BY
Adams & Cwayna
ATTORNEYS Sept. 26, 1967 M. E. OLSON 3,343,678
BEESWAX CAPPING SEPARATOR AND MELTER
Filed June 1, 1964 4 Sheets-Sheet 2

INVENTOR.
MELFORD E. OLSON
BY
Adams & Cuayna
ATTORNEYS

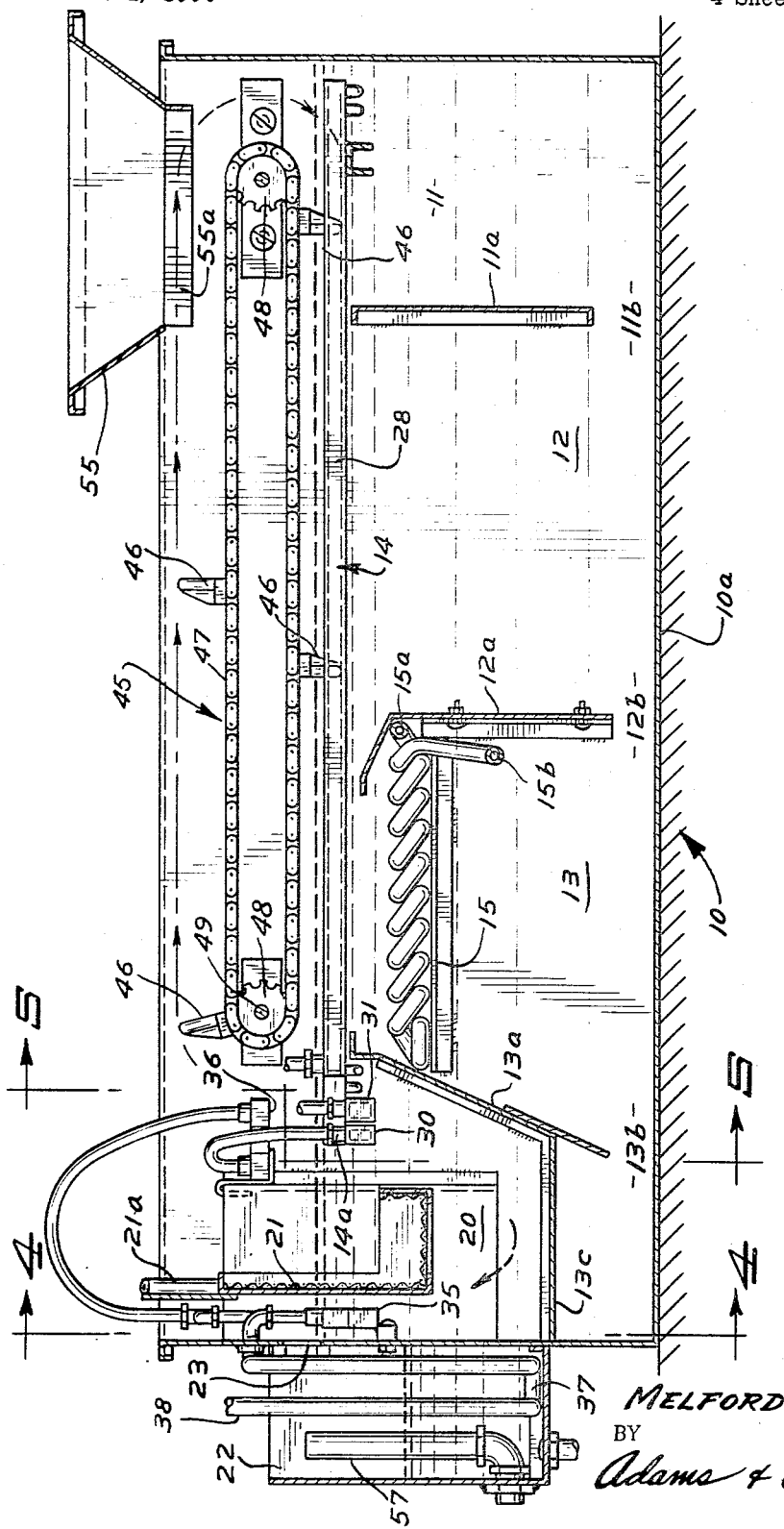

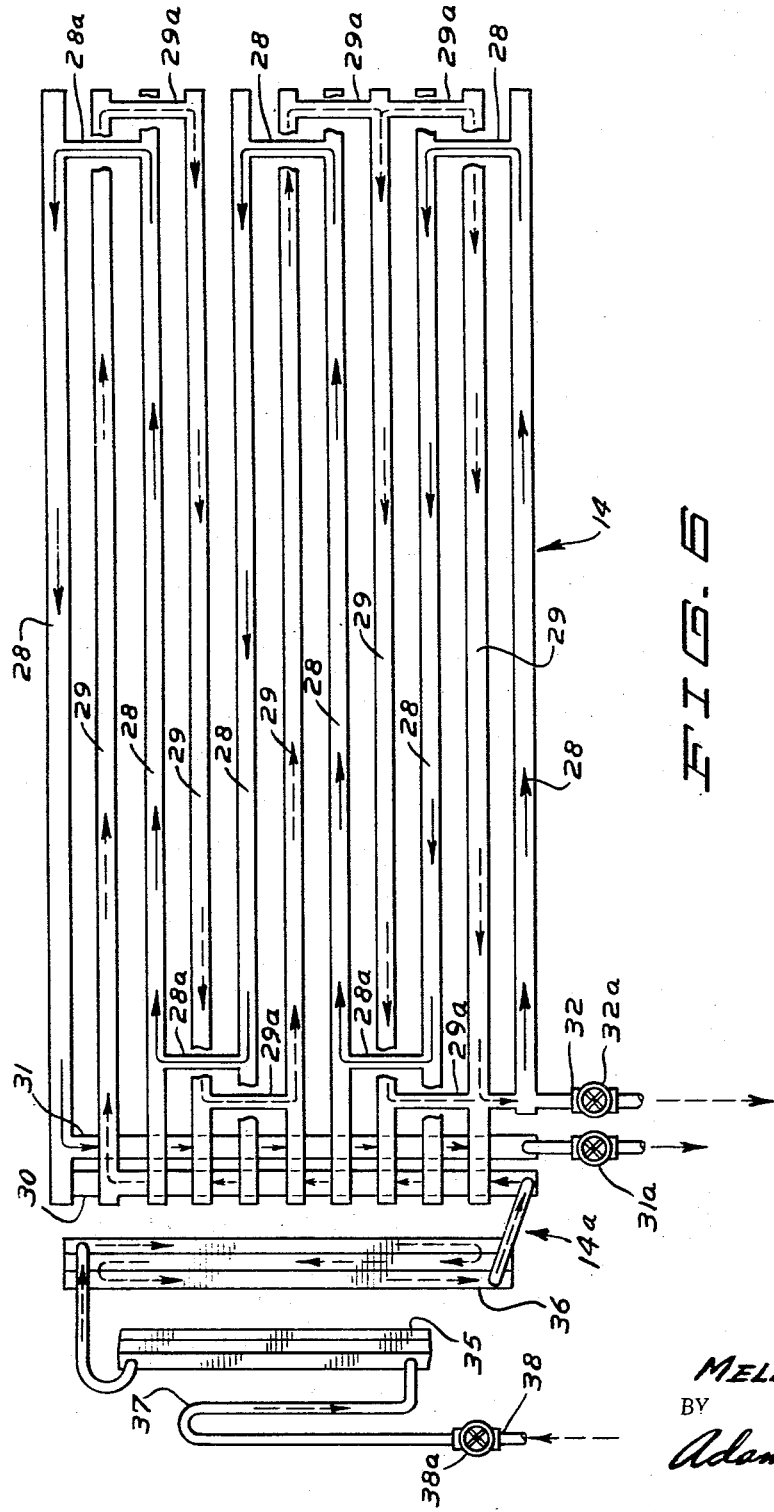

United States Patent Office 3,343,678
Patented Sept. 26, 1967

3,343,678
BEESWAX CAPPING SEPARATOR AND MELTER
Melford E. Olson, 5201 Douglas Drive,
Minneapolis, Minn. 55429
Filed June 1, 1964, Ser. No. 371,625
5 Claims. (Cl. 210—182)

This invention relates generally to beeswax capping separators and melter apparatus and more particularly to a temperature control and heat distribution system for a capping melter and separator to effectively remove the honey from beeswax cappings by melting the cappings without damaging the honey due to excessive heat.

In the past various separators which provide for the removal of honey from beeswax cappings upon the application of heat have been provided. Applicant however has provided in this application a beeswax capping separator and melter having a heating source which may be effectively regulated according to the amount and number of cappings which will be placed in the separator such that the melting process will occur at a temperature below a certain critical temperature; this temperature being one at which the honey will be completely removed and separated from the cappings without damaging the same.

A beeswax capping is comprised of beeswax, honey and a small amount of impurities known as slumgum. To effectively remove the honey from the beeswax and slumgum heat is applied to the capping and the honey is released upon the melting of the beeswax. The apparatus of this invention allows for precise control of the heating source such that a minimum amount of honey is exposed to high heat which heat would damage the honey as to both color and taste.

As shown in my co-pending application entitled Beeswax Capping Melter, S.N. 277,771, filed May 3, 1963, now Patent No. 3,272,339, a plurality of spaced heating coils are arranged longitudinally within a compartmented tank having a feeder hopper on one end of the coils and a product removal arrangement on the other end of the coils. Propelling means in the form of rakes are also provided which move the cappings from the hopper to the product removal end of the tank and as they are moved therealong the cappings take on heat to melt and release the products. Various partitions are provided in the separator to aid in separating the products until they are finally separated into the various components of cool undamaged honey, a minimum of warm damaged honey, slumgum and beeswax. The added advantage of the melter of this application is a dual heat source wherein the operator is allowed the choice of heating all of the heating coils or to heat only a select number of the coils. This versatility allows the operator to apply the correct amount of heat to correspond to the speed of his uncapping and extracting.

The heating coils of this particular device are specifically designed to heat the cappings while contacting only a very small percentage of the honey such that only this small percentage will be damaged.

It is therefore an object of applicant's invention to provide a beeswax capping separator and melter apparatus which allows the operator to apply a predetermined amount of heat to the cappings to correspond to the speed of his uncapping and extraction operation.

It is a further object of applicant's invention to provide a plurality of heating coils to provide a heating surface for engaging beeswax cappings and separating the products therefrom and wherein the coils are provided with heat control means to specifically control the heat supplied thereto and thus control the heat delivered to the cappings thereby controlling the melting rate of the cappings.

It is a further object of applicant's invention to provide a compartmented heated tank system wherein the heat within the compartments may be specifically controlled to control the temperature of the products contained in the compartments to thus insure complete removal and separation of beeswax capping products at the most effective rate while protecting the products from excessive damaging heat.

It is a further specific object of applicant's invention to provide segregated discharge means for the individual products provided by beeswax cappings and to provide means for controlling the discharge of the products.

These and other objects and advantages of my invention will more fully appear from the following description made in connection with the accompanying drawing, wherein like reference characters refer to the same or similar parts throughout the several views, and in which:

FIG. 1 is a perspective view showing a beeswax capping separator and melter embodying the concepts of applicant's invention;

FIG. 3 is a vertical section taken substantially along line 3—3 of FIG. 2;

FIG. 4 is a vertical section taken substantially along line 4—4 of FIG. 3;

FIG. 5 is a vertical section taken substantially along line 5—5 of FIG. 3; and

FIG. 6 is a schematic illustration of the coil heating system.

Figure 2:
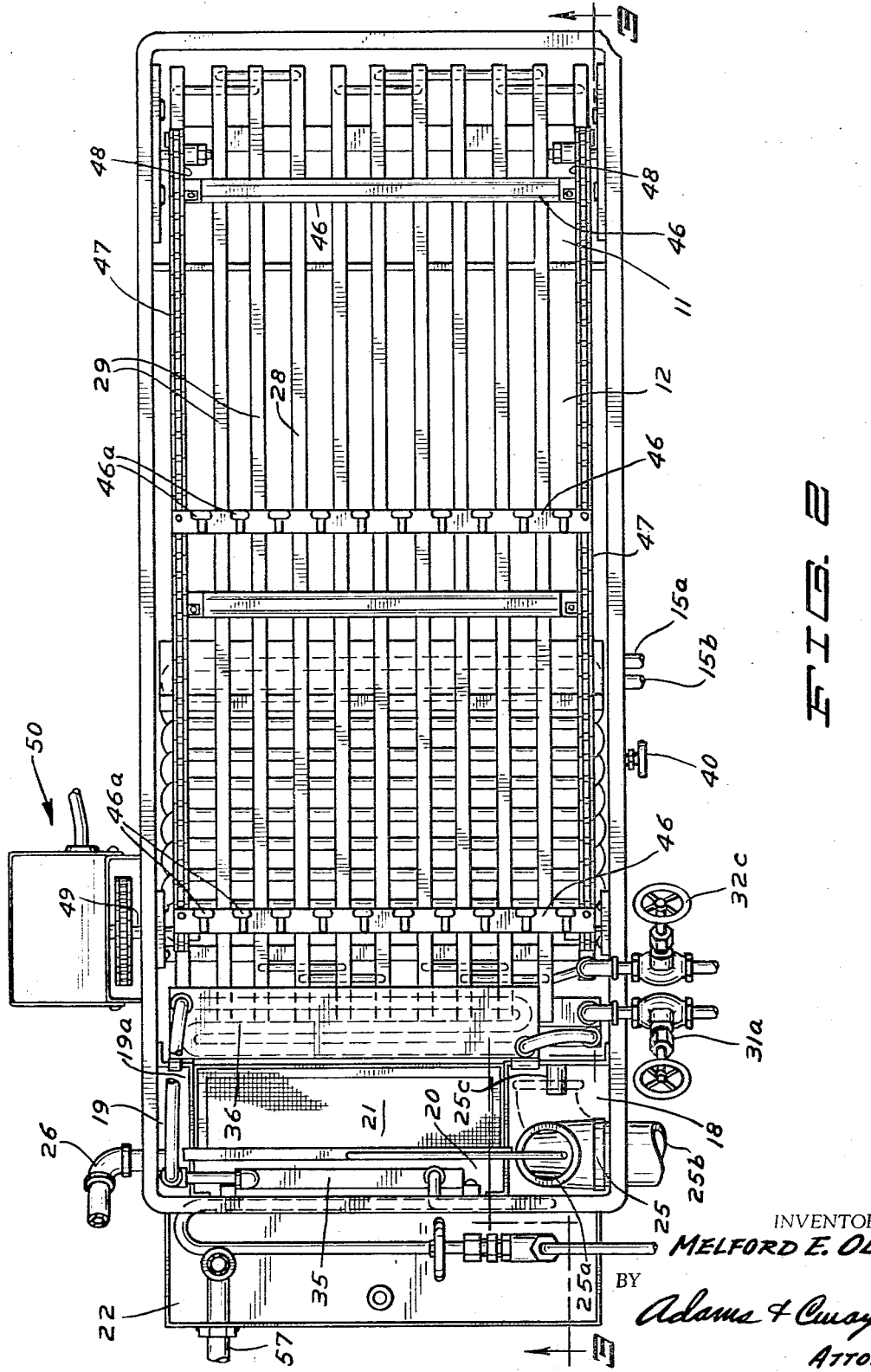
FIG. 2 is a plan view of FIG. 1 with the hopper portion removed.

In accordance with the accompanying drawing the beeswax capping melter and separator generally comprises a tank 10 provided with a plurality of main compartments 11, 12 and 13 arranged longitudinally therein and having a main heating coil 14 arranged in vertically spaced relation from the bottom 10a of tank 10 to overlie the compartments. A secondary coil 15 which is in effect a cooling coil is mounted in compartment 13 in upwardly spaced relation from the bottom 10a of tank 10 below coil 14, the purpose of which will be completely described hereinafter. The tank 10 is divided into a plurality of product discharge compartments generally designated 18 for the cool honey discharge portion 19 as the hot honey discharge compartment and a wax accumulating and discharge compartment 20. The wax compartment is provided with a foraminous basket 21 which receives and separates the hot melted wax from the slumgum to provide clean wax as a discharge product. A wax storage compartment 22 is provided externally of the main tank 10 to receive liquid wax from compartment 20 through passage 23 formed in the wall of tank 10. Wax is stored in the storage compartment 22 until enough has accumulated to run off into wax mold containers.

A plurality of partitions designated 11a, 12a, and 13a are provided transversely within the tank 10 to provide the various compartments 11, 12 and 13 and in the form shown these partitions are spaced upwardly from the bottom 10a of the tank 10 to provide passages 11b, 12b and 13b thereunder. Another baffle or partition member designated 13c is arranged horizontally across the tank 10 and provides a baffle area between the partition 13b and the end of the tank 10. This baffled area below partition 13c communicates with only the cool honey compartment 18 by providing an opening 13d through partition 13c upward into compartment 18.

A cool honey outlet in the form of an elbow member 25 is rotatably mounted on the side wall of the tank 10 such that the inlet opening 25a may be vertically shifted such that the level of honey being discharged through the elbow outlet 25b may be controlled. A stop member 25c is arranged in compartment 18 to limit the rotation for presenting the inlet 25a at a maximum horizontal position.

By providing a lower baffle member 13c a closed compartment 20 is provided by the walls of compartment 18, the horizontal partition 13c and partition 13a. This area is designed to receive all of the melted wax and heated damaged honey. A hot honey compartment 19 is formed within this area by providing a vertical partition 19a to provide an upwardly disposed opening 19b from the wax compartment 20 to the hot honey compartment 19 as best seen in FIG. 4. Hot honey being more dense than the wax will flow into the lower portion of compartment 20 and upwardly through opening 19b into compartment 19 where it may be drained by the hot honey outlet 26. This hot honey outlet 26 is also rotatably mounted on the side walls of tank 10 such that the removal level may be controlled by shifting the elevation of this outlet 26.

Heating coil 14 comprises a plurality of longitudinally spaced tubular elements which for the sake of further description, although all the tubes are substantially identical, will be listed alternately as 28, 29 as shown in FIG. 6. All the tubes comprising the entire coil 14 extend from one end of the tank 10 and terminate within the wax compartment 20 such that the innermost end 14a of the coils will lie within the compartment 20. The coil system 14 is provided with a pair of manifolds 30–31 on the innermost end 14a and a plurality of inner connecting manifolds designated 28–29a are also arranged on both ends. As shown in the schematic diagram of FIG. 6 the manifolds 30–31 are provided respectively as an inlet and outlet manifolds while the inner connecting manifolds 28a–29a respectively connect tubular pairs which are designated 28–29. This arrangement is easily seen in FIG. 6 wherein the tubular members provided with dotted flow lines are all designated 29 or 29a and those provided with solid flow lines are designated 28 and 28a.

Applicant's coil system 14 establishes a dual coil system wherein hot water may be fed into inlet manifold 30 and therefrom into the coil system designated 29 and 29a and subsequently may pass from the coil system through another discharge member 32. A valve 32a will control the discharge from member 32 and if this valve 32a is open water will immediately be discharged from the coil system 14 and the coils 28 and 28a will not receive heat. However, if it is desirable to heat the entire bank of coils valve 32 will be closed and valve 31a on discharge manifold 31 will be opened. This will then force the hot water into the coil system designated 28 and 28a and will finally discharge through the discharge manifold 31 past now open valve 31a. This arrangement of course allows the operator to control the heat within the tank 10 in that he may control the heat according to his rate of melting and rate of extraction through the hot honey 26 and cold honey 25 outlet.

Two additional manifold systems are shown in FIG. 6, these being respectively a hot honey and wax compartment manifold 35 which is mounted in the hot honey and wax compartment 20 to complete melting of all the wax in this compartment. As best shown in FIGS. 2 and 3, this manifold 35 is arranged behind the slumgum basket 21. A second manifold 36 is likewise arranged in relation to compartment 20 but is vertically spaced upwardly from the normal wax level. This is done to insure complete separation of the wax, particularly that which floats above the normal surface of the melting products. One further member which could be termed a heating coil 37 is arranged in preceding relation to the manifolds 35 and 36 and is arranged to lie on the bottommost portion of the wax storage compartment 22. An inlet conduit 38 and valve 38a are arranged to admit hot water into the entire arrangement consisting of coil 37, manifolds 35–36 and coil 14 are arranged in series.

An additional coil 15 is, as previously stated, arranged in compartment 13 and is provided with an inlet 15a and outlet 15b. This coil is provided for cooling the honey in compartment 13 whenever the temperature gets over a critical temperature which would cause damage by overheating the honey. A thermometer 40 is arranged on the side wall of tank 10 adjacent the compartment 13 and has its temperature sensing portion 40a passing through the side wall into compartment 13.

A capping propelling device designated in its entirety 45 arranged in overlying vertical relation to the coil system 14 and in the form shown consists of a plurality of rake members 46 extending transversely across the coil system 14 and having teeth 46a thereon which will interfit with the coils as shown in FIG. 5 to urge the cappings therealong. The ends of the rakes 46 are accordingly fastened to chain members 47 which are driven around a pair of spaced apart sprocket members 48—48. A drive system 50 including an electric motor 51 is arranged in driving relation to one set of sprockets 48 by driving a drive shaft 49 connected thereto.

Rakes 46 are designed such that the teeth 46a will interfit between the coils 28 and 29 and will urge cappings therealong. The rakes 46 are slowly driven from a feed end which is provided with a hopper arrangement 55 coil system to the product discharge end. Applicant has found that one effect of the rakes is to not only move the cappings but also agitate the cappings as they are moved along the heated coils to cause rapid separation. Rapid separation is important because separation must be accomplished before the honey is damaged by overheating or prolonged contact with hot slumgum.

Hopper 55 may be provided with internal grating bars 55a to prevent cappings from dropping directly into and onto the coil system underlying the hopper 55.

The slumgum basket 21 previously mentioned is arranged in relation to receive all of the hot honey, wax and slumgum passing into compartment 20. As the products pass therethrough the slumgum is captured and thus may be easily removed and cleaned from the tank 10. A handle member 21a may be provided to lift the basket 21 from the tank 10.

The melting of honey and the correlation between all the portions of the melter will best be described in an operational statement. The coils are initially heated by introducing steam or hot water into the inlet conduit 38 where it will pass into the heated coil 37 of wax compartment 22 and serially into the first hot honey and wax compartment manifold 35 and then into the second elevated manifold 36. From this manifold 36 the heating medium will pass into the inlet conduit 30 of coil system 14 where it will assume and follow the path as indicated by the dotted arrows and following the conduits marked 29 and 29a. If the operator desires to quickly heat the entire coil bank he will close valve 32a and open valve 31a which will then direct the heating medium to the coil system number 28 and 28a.

Beeswax cappings may now be introduced into the tank 10 through the hopper 55 where they will be directed into compartment 11 and will be confined therein by partition 11a. Partial separation due to gravity takes place in compartment 11 where the honey will settle to the bottom and pass through passage 11b. Wax cappings tend to float and remain in close proximity to coil 14 and will be carried along to subsequently pass over the top of partition 12a. Naturally as the cappings are being carried therealong they will continue to melt and the products will be separated. The honey in compartment 13 may be kept at a cool temperature below a predetermined damaging temperature by introducing cool water into the coil system 15. The cool undamaged honey at this point will pass through the passage 13b and upwardly through passage 13d in the horizontal baffle 13c to the cool honey compartment 18 where its discharge flow may be regulated by vertically shifting the outlet elbow 25.

The beeswax, slumgum and a small percentage of honey will be directed over partition 13a into compartment 20 and through the slumgum trapping basket 21. The honey in this compartment will be overheated and damaged. As seen in FIG. 4 this honey will pass upwardly through opening 19b into the hot honey outlet compartment 19 where it will discharge through the outlet elbow 26. The wax contained in compartment 20 will pass through the hot wax outlet 23 into the wax storage compartment 22 where it may be subsequently drawn off through the wax outlet 57. Slumgum which has remained in the basket 21 may be removed periodically.

The advantage provided in this separator and melter is primarily the coil system 14 consisting of the two separate coils of alternating heating tubes. The dual coil system allows the operator a choice as to the amount of heat he wishes to apply. The amount of heat will correspond to the uncapping and extracting speed.

The flow of honey is regulated by raising and lowering the two honey outlets. A very slow stream of hot honey is required for satisfactory results.

It should be obvious that applicant has provided a new and unique coil system and method for heating beeswax cappings to extract the products by providing a dual heating coil and means for controlling the heat supply to the coils to intelligently control the extraction speed of the separator.

It should, of course, be understood that various changes may be made in the form, details, arrangements and proportion of parts without departing from the scope of my invention, which generally stated consist in the matter set forth in the appended claims.

What I claim is:

1. A beeswax capping separator for recovering honey, beeswax and other products including:
   (a) a separating tank having a plurality of partitions therein to provide at least a melted honey collection compartment and a melted wax collection compartment and to provide means for segregating the products as they are melted within the tank;
   (b) a plurality of elongated substantially parallel heating elements mounted in the upper portion of the tank for heating and separating of the capping products as they flow therepast including:
      (1) a first set of said heating elements arranged in substantially planar relation being connected in series to provide a predetermined heating area to beeswax cappings having inlet means on one end thereof and outlet means on the other end thereof;
      (2) a second set of heating elements connected in series and arranged in substantially co-planar relation within said first set to provide additional heating area to the beeswax cappings having inlet means on one end thereof and outlet means on the other end thereof;
   (c) means supplying heat to the first set of said heating elements to melt beeswax cappings supplied thereto;
   (d) means for selectively connecting the outlet of the first of said heating element sets to the inlet of said second heating element sets to increase the heated area; and
   (e) communication means for removal of the products from the collecting compartments of the tank.

2. The structure set forth in claim 1 and a third set of heating elements arranged within said wax collection compartment, having an inlet and an outlet with means supplying heat to said inlet.

3. The structure set forth in claim 2 wherein said outlet of said third set of heating elements is connected to the inlet of said first set of heating elements whereby heat is supplied to said first set.

4. The structure set forth in claim 1 and a cooling coil arranged on one end of said honey collection compartment adjacent said removal communication means below said heating elements with means for supplying a cooling medium thereto.

5. The structure set forth in claim 1 and a heating manifold arranged in vertically spaced relation to said wax collection compartment to normally overlie the wax level therein with means for supplying heat thereto.

References Cited

UNITED STATES PATENTS

| | | | |
|---|---|---|---|
| 1,263,944 | 4/1918 | Severin | 210—184 X |
| 2,111,748 | 3/1938 | Brand | 210—187 |
| 2,520,304 | 8/1950 | Brand | 210—187 |
| 3,272,339 | 9/1966 | Olson | 210—184 X |

REUBEN FRIEDMAN, *Primary Examiner.*

C. M. DITLOW, *Assistant Examiner.*